July 17, 1956 J. R. PARSONS 2,755,385

PULSING OSCILLATOR

Filed March 27, 1953

INVENTOR.

JOHN R. PARSONS

BY Charles H. Brown

ATTORNEY 2,755,385

PULSING OSCILLATOR

John R. Parsons, Pennsauken, N. J., assignor, by mesne assignments, to the United States of America as represented by the Secretary of the Navy Application March 27, 1953, Serial No. 345,078

2 Claims. (Cl. 250—36)

This invention relates to a pulsing oscillator and more particularly to vacuum tube oscillators by which bursts or trains of oscillations are suddenly initiated and caused to continue for a predetermined period of time and then suddenly stopped only to resume again after another predetermined period of time.

It is an object to provide a pulsing oscillator wherein the frequency of the oscillation bursts (the higher frequency) is determined by the values of certain circuit components and the repetition rate at which the bursts recur (the lower frequency) is determined by the values of certain other circuit components, so that the values of circuit components can be independently varied to provide operation with any desired higher frequency and lower frequency.

It is another object to provide an improved pulsing oscillator which is simple and economical in construction and which employs only a single vacuum tube.

In one aspect, the pulsing oscillator comprises a periodically conducting pentode vacuum tube circuit with a first capacitor charging and discharging circuit including a capacitor connected between the plate and the control grid to render the tube alternately conductive and nonconductive. A second capacitor charging and discharging circuit includes a capacitor connected between the screen grid and the suppressor grid to cause the current drawn by the tube (when the tube is conductive) to be drawn alternately by the plate and the screen grid.

These and other objects and aspects of the invention will be apparent to those skilled in the art from the following description taken together with the appended drawings wherein.

Figure 1:
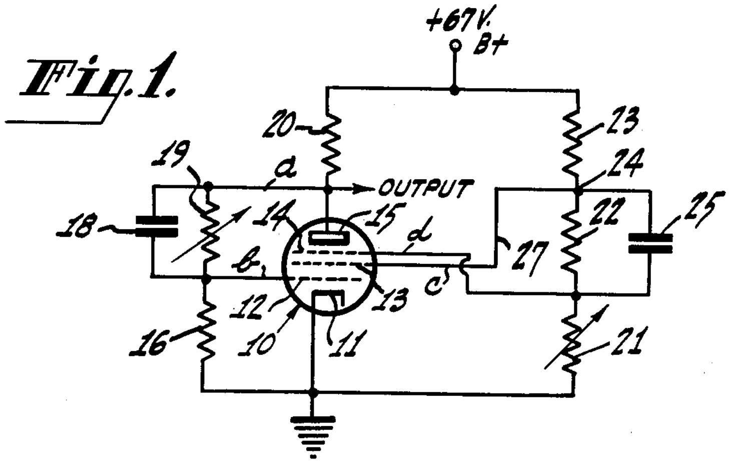
Fig. 1 is a circuit diagram of an embodiment of the invention.

In the drawing, there is shown a pentode vacuum tube 10 provided with a cathode 11, a control grid 12, a screen grid 13, a suppressor grid 14, and a plate 15. A grid resistor 16 is connected between cathode 11 and control grid 12. A capacitor 18 and a resistor 19 connected in parallel are connected between the control grid 12 and the plate 15. A load resistor 20 is connected from plate 15 to the positive terminal, labeled B+, of a source of uni-directional potential (not shown). The negative terminal of the source is connected to ground. A resistor 21 is connected between the cathode 11 and the suppressor grid 14. The suppressor grid 14 is connected through resistors 22 and 23 to the B+ terminal. The junction point 24 between resistors 22 and 23 is connected to the screen grid 13. A capacitor 25 is shunted across resistor 22.

Figure 2:
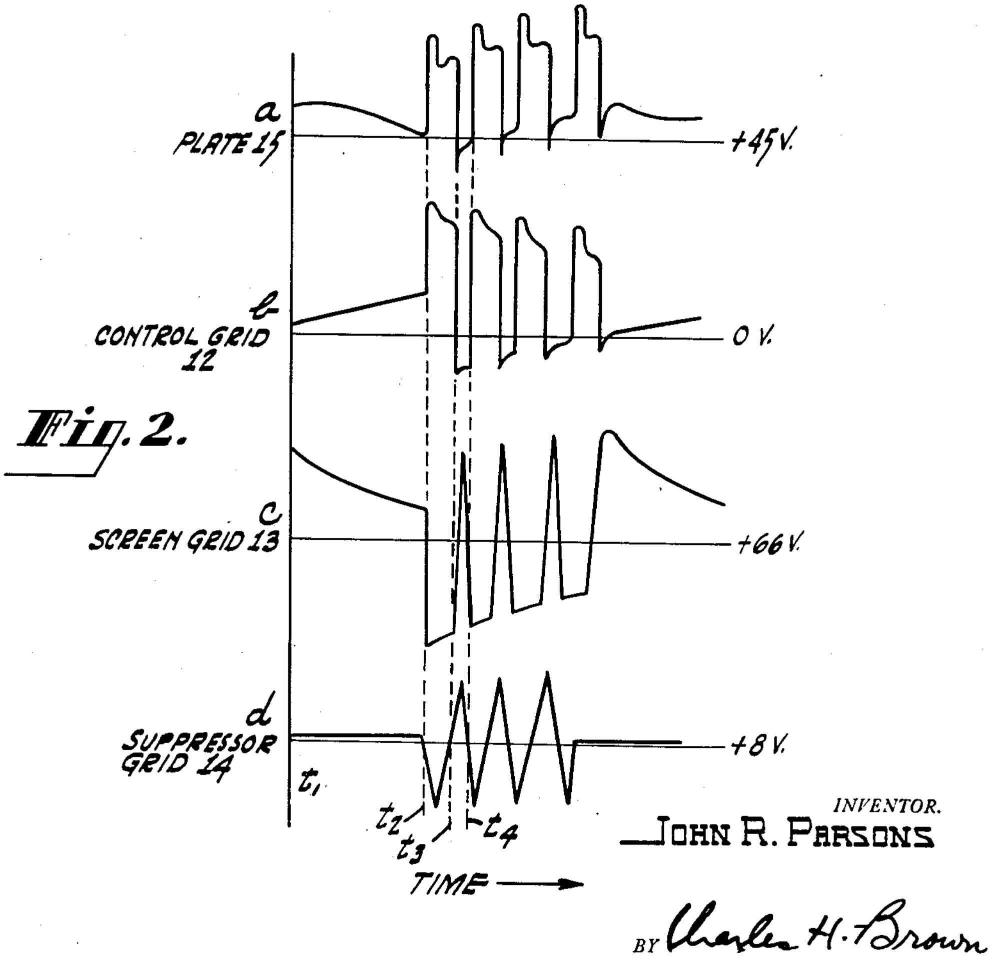
Fig. 2 is a chart of voltage waveforms at various designated points in the circuit of Fig. 1 when certain values of circuit components are employed.

In the operation of the system, capacitors 18 and 25 are initially assumed to be charged so that the potentials of the control grid 12 and the suppressor grid 14 are near that of the cathode 11 which is at ground potential (time $t_1$ of waveforms *b* and *d* of Fig. 2). Under these conditions plate current begins to flow through plate resistor 20 causing the potential on plate 15 to fall (period $t_1$—$t_2$ of waveform *a* of Fig. 2). Screen grid current flowing from B+ through resistor 23 increases causing the potential on screen grid 13 to drop due to the IR drop in resistor 23 (period $t_1$—$t_2$ of wavefrom *c* of Fig. 2). However, as the potential on the screen grid 13 drops, the screen grid current is maintained at a high value by the discharge of capacitor 25 in the loop including lead 27, screen grid 13, cathode 11 and resistor 21. This current in flowing through resistor 21 causes a voltage drop thereacross which pulls the potential on suppressor grid 14 down below the potential of cathode 11 which is at ground (time $t_2$ of waveform *d* of Fig. 2). The low potential on suppressor grid 14 combined with the relatively high potential on screen grid 13 causes the plate 15 to be practically cut off and most of the current to be drawn by the screen grid 13. Simultaneously, the cutting off of plate current causes a rise in potential on plate 15 (time $t_2$ of waveform *d* of Fig. 2) which is coupled through capacitor 18 to cause a positive voltage to be developed across grid resistor 16 and applied to control grid 12. The discharging of capacitor 25, by its above-mentioned effects on the potentials of the suppressor grid 14 and the control grid 12, causes the screen grid 13 to draw as much current as possible and the plate 15 to draw little or no current (period $t_2$—$t_3$ of Fig. 2).

When capacitor 25 is discharged, it no longer maintains a current through screen grid 13 and resistor 21, and consequently the potential on suppressor grid 14 rises (time $t_3$ of Fig. 2). This permits the current in the tube to be drawn by the plate 15 rather than the screen grid 13 (period $t_3$—$t_4$ of Fig. 2). When no screen grid current is drawn through resistor 21, current flows from B+ through resistor 23 into capacitor 25. As capacitor 25 becomes charged, the potential at junction point 24 and on screen grid 13 rises. When the potential on capacitor 25 and the screen grid 13 reaches a sufficiently high potential, the capacitor again starts discharging through screen grid 13 and resistor 21 thus lowering the potential on suppressor grid 14 and causing the plate 15 to be cut off and the screen grid 13 to draw all the current. The shifting back and forth between the conditions wherein first the plate 15 draws current and then the screen grid 13 draws current constitutes a high frequency oscillation in the circuit which is available as an output wave from the plate 15.

These high frequency oscillations continue as a burst of oscillations until the charge on capacitor 18 builds up to the point that the potential thereon applied to control grid 12 cuts the tube off. The reason for this cut-off action of tube 10 is as follows. During every positive excursion of the high frequency oscillation on the plate 15, more charge is placed on capacitor 18 than is removed by the following negative excursion. This is true because as is evident from waveform *a* of Fig 2, the positive excursion has a long duration than the negative excursion. Finally, the charge on capacitor 18 reaches such a value that by voltage divider action the potential across grid resistor 16 is reduced to the point where the potential applied to grid 12 cuts off tube 10. The tube remains cut off for the period of time required for capacitor 18 to discharge. When capacitor 18 is sufficiently discharged so that current again flows in the tube, the cycle of operation repeats with the plate 15 and the screen grid 13 alternately drawing current to create the high frequency oscillations or bursts.

The period of time between bursts or the repetition rate of the bursts of oscillations conveniently may be varied by varying the value shunt resistor 19. The time between bursts varies directly as a function of the value of the capacitor 18 and inversely as a function of the value of shunt resistor 19.

The frequency of the high frequency oscillations in the burst of oscillations conveniently may be varied by varying the value of resistor 21. The value of resistor 21 determines the effect of screen current resulting from the discharge of capacitor 25 on the potential of supressor grid 14. If desired, resistor 22 and/or capacitor 25 may be made variable to change the frequency of the high frequency oscillations.

The values of other circuit components, especially capacitors 18 and 25, also affect the high and low frequencies of operation and combinations of circuit element values can be found to provide any desired frequencies of operation.

By way of example only, a circuit constructed according to Fig. 1 with the following values of circuit components provided high frequency bursts with a frequency of 2640 cycles per second and a low frequency or repetition rate of bursts of 660 bursts per second:

| | |
|---|---|
| Resistor **16**________ohms__ | 100,000 |
| Variable resistor **19**________do____ | 170,000 |
| Resistor **22**________megohms__ | 6.8 |
| Resistor **23**________ohms__ | 100,000 |
| Variable resistor **21**________megohms__ | 1–2 |
| Resistor **20**________ohms__ | 10,000 |
| Capacitor **18**________microfarads__ | 0.5 |
| Capacitor **25**________micromicrofarads__ | 200 |

The waveforms at various identified points in the circuit were as shown in Fig. 2. The specific forms of the waveforms produced differ somewhat from those shown in Fig. 2 when different specific values of circuit components are used. However, the theory of operation remains the same as described.

What is claimed is:

1. A pulsing oscillator comprising a vacuum tube having a cathode, a control grid, a screen grid, a suppressor grid and a plate, a source of unidirectional potential having a positive terminal and a negative terminal connected to said cathode, a resistor connected between said plate and said positive terminal, a first capacitor charging and discharging circuit including serial resistors connected between said positive and negative terminals and including a capacitor connected in parallel with an intermediate one of said serial resistors and connected between said screen grid and said suppressor grid, and a second capacitor charging and discharging circuit including a capacitor and a resistor in parallel connected between said plate and said control grid and including a resistor connected between said control grid and said cathode.

2. A pulsing oscillator comprising a vacuum tube having a cathode, a control grid, a screen grid, a suppressor grid and a plate, a source of unidirectional potential having a positive terminal connected to the plate and a negative terminal connected to said cathode, a first capacitor and a resistor in parallel connected between said screen and suppressor grids, means to charge said capacitor from said source, means to discharge said capacitor through a path including said screen grid and cathode, a second capacitor and a resistor in parallel connected between said plate and said control grid, whereby said second capacitor alternately charges and discharges to render said tube alternately conductive and non-conductive.

References Cited in the file of this patent

UNITED STATES PATENTS

| | | |
|---|---|---|
| 2,172,746 | Young ________ | Sept. 12, 1939 |
| 2,412,485 | Whiteley ________ | Dec. 10, 1946 |
| 2,541,230 | Fleming-Williams ________ | Feb. 13, 1951 |
| 2,552,949 | Fleming-Williams ________ | May 15, 1951 |
| 2,627,025 | Trembly ________ | Jan. 27, 1953 |

FOREIGN PATENTS

| | | |
|---|---|---|
| 644,086 | Great Britain ________ | Oct. 4, 1950 |